(12) United States Patent
Lu et al.

(10) Patent No.: US 9,817,525 B2
(45) Date of Patent: Nov. 14, 2017

(54) TOUCH PANEL

(71) Applicant: Novatek Microelectronics Corp., Hsinchu (TW)

(72) Inventors: Shih-Jung Lu, Hsinchu (TW); Wing-Kai Tang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 14/140,559

(22) Filed: Dec. 26, 2013

(65) Prior Publication Data

US 2015/0015534 A1 Jan. 15, 2015

(30) Foreign Application Priority Data

Jul. 15, 2013 (TW) ................... 102125266 A

(51) Int. Cl.
*G06F 3/044* (2006.01)
(52) U.S. Cl.
CPC .................... *G06F 3/044* (2013.01)
(58) Field of Classification Search
CPC ........... G06F 3/044; G06F 2203/04111; G06F 2203/04103; G06F 2203/04107; G06F 2203/04112; G06F 3/041; G06F 3/0412
See application file for complete search history.

(56) References Cited

U.S. PATENT DOCUMENTS

2004/0235227 A1* 11/2004 Kawase ................ G02F 1/1368
438/158
2010/0194696 A1 8/2010 Chang et al.
(Continued)

FOREIGN PATENT DOCUMENTS

| CN | 101833408 | 9/2010 |
|---|---|---|
| CN | 101893962 | 11/2010 |

(Continued)

OTHER PUBLICATIONS

"Office Action of Taiwan Counterpart Application" , dated Jun. 15, 2015, p. 1-p. 9.

(Continued)

*Primary Examiner* — Jose Soto Lopez
(74) *Attorney, Agent, or Firm* — JCIPRNET

(57) ABSTRACT

The touch panel includes a plurality of touch pads arranged in an array on the touch panel. Each of the touch pads are arranged in N columns and M rows, the touch pad in the $i^{th}$ column and in the $j^{th}$ row is coupled to the touch pad in the $(i-1)^{th}$ column and in the $(j-1)^{th}$ row and the touch pad in the $(i+1)^{th}$ column and in the $(j+1)^{th}$ row, or the touch pad in the $i^{th}$ column and in the $j^{th}$ row is coupled to the touch pad in the $(i+1)^{th}$ column and in the $(j-1)^{th}$ row and the touch pad in the $(i-1)^{th}$ column and in the $(j+1)^{th}$ row.

7 Claims, 8 Drawing Sheets

400

(56) References Cited

U.S. PATENT DOCUMENTS

| | | | |
|---|---|---|---|
| 2011/0057900 A1* | 3/2011 | Huang et al. ................. 345/174 |
| 2011/0234510 A1* | 9/2011 | Jeong ....................... G06F 3/044 |
| | | | 345/173 |
| 2011/0304582 A1* | 12/2011 | Ho ........................... G06F 3/044 |
| | | | 345/174 |
| 2012/0098784 A1* | 4/2012 | Kim ......................... G06F 3/044 |
| | | | 345/174 |
| 2012/0105344 A1* | 5/2012 | Ko ......................... G06F 3/0412 |
| | | | 345/173 |
| 2012/0175235 A1* | 7/2012 | Jiang ....................... G06F 3/044 |
| | | | 200/600 |
| 2013/0050107 A1* | 2/2013 | Xie ......................... G06F 3/044 |
| | | | 345/173 |
| 2013/0168221 A1* | 7/2013 | Xie ......................... G06F 3/044 |
| | | | 200/600 |
| 2013/0194213 A1* | 8/2013 | Chou ....................... G06F 3/044 |
| | | | 345/173 |
| 2014/0015766 A1* | 1/2014 | Lin ......................... G06F 3/044 |
| | | | 345/173 |
| 2014/0028926 A1* | 1/2014 | Jiang ................... G02F 1/13338 |
| | | | 349/12 |
| 2014/0035864 A1* | 2/2014 | Chang ..................... G06F 3/044 |
| | | | 345/174 |
| 2014/0174902 A1* | 6/2014 | Yang ....................... G06F 3/044 |
| | | | 200/600 |
| 2014/0197018 A1* | 7/2014 | Chen ................... H03K 17/9622 |
| | | | 200/600 |
| 2014/0293160 A1* | 10/2014 | Tang ................... G02F 1/13338 |
| | | | 349/12 |
| 2014/0300833 A1* | 10/2014 | Yang ....................... G06F 3/044 |
| | | | 349/12 |

FOREIGN PATENT DOCUMENTS

| | | |
|---|---|---|
| EP | 2487567 | 8/2012 |
| TW | 201327307 | 7/2013 |

OTHER PUBLICATIONS

"First Office Action of China Counterpart Application", dated Nov. 1, 2016, p. 1-p. 7.

* cited by examiner

510

520

TOUCH PANEL

CROSS-REFERENCE TO RELATED APPLICATION

This application claims the priority benefit of Taiwan application serial no. 102125266, filed on Jul. 15, 2013. The entirety of the above-mentioned patent application is hereby incorporated by reference herein and made a part of this specification.

BACKGROUND OF THE INVENTION

Field of the Invention

The invention relates to a touch panel.

Description of Related Art

A conventional capacitive touch panel is often composed of a plurality of single-layered or double-layered touch pads. Please refer to FIG. 1 which schematically illustrates a conventional capacitive touch panel 100. To detect touch actions on the capacitive touch panel 100, the capacitive touch panel 100 is equipped with a plurality of signal transmission channels ZX1 to ZX6 and ZY1 to ZY6. The signal transmission channels ZX1 to ZX6 may serve to transmit driver signals to the capacitive touch panel 100 and determine the capacitance variation on the touch panel 100 by receiving reception signals that are generated in response to the driver signals and received from the signal transmission channels ZY1 to ZY6. Through the capacitance variation, the touch actions on the capacitive touch panel 100 may be detected.

In the conventional capacitive touch panel 100, the number of the signal transmission channels ZX1 to ZX6 and ZY1 to ZY6 is proportional to the area occupied by touch pads in the touch panel 100. That is, if the size of the touch panel 100 increases, the number of the required signal transmission channels also increases, and so does the layout area where the signal transmission channels are arranged. In addition, when signals are transmitted through the signal transmission channels, certain hardware with a number of signal transmission channels is correspondingly required, thus boosting the cost of the resultant products.

SUMMARY OF THE INVENTION

The invention is directed to a touch panel that is able to effectively reduce the number of signal transmission channels required by the touch panel.

In an embodiment of the invention, the touch panel includes a plurality of touch pads arranged in an array on the touch panel. The touch pads are arranged in N columns and M rows, the touch pad in the $i^{th}$ column and in the $j^{th}$ row is coupled to the touch pad in the $(i-1)^{th}$ column and in the $(j-1)^{th}$ row and the touch pad in the $(i+1)^{th}$ column and in the $(j+1)^{th}$ row, or the touch pad in the $i^{th}$ column and in the $j^{th}$ row is coupled to the touch pad in the $(i+1)^{th}$ column and in the $(j-1)^{th}$ row and the touch pad in the $(i-1)^{th}$ column and in the $(j+1)^{th}$ row, N and M are positive integers, and i and j are positive integers greater than 1 and respectively smaller than (N−1) and (M−1).

In an embodiment of the invention, the touch pad in the $i^{th}$ column and in the $j^{th}$ row is physically isolated from the touch pad in the $i^{th}$ column and in the $(j-1)^{th}$ row, the touch pad in the $i^{th}$ column and in the $(j+1)^{th}$ row, the touch pad in the $(i+1)^{th}$ column and in the $j^{th}$ row, and the touch pad in the $(i-1)^{th}$ column and in the $j^{th}$ row.

According to an embodiment of the invention, each of the touch pads is shaped as a polygon.

According to an embodiment of the invention, at least one of the touch pads in the first column and/or in the $N^{th}$ row is connected to another one of the touch pads in the first column and/or in the $N^{th}$ row so as to share a signal transmission channel.

In view of the above, the arrangement of the touch pads in the touch panel described herein allows the number of the signal transmission channels required by the touch pads that cover a predetermined touch area to be effectively reduced.

Several exemplary embodiments accompanied with figures are described in detail below to further describe the invention in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DETAILED DESCRIPTION OF DISCLOSED EMBODIMENTS

Figure 1:
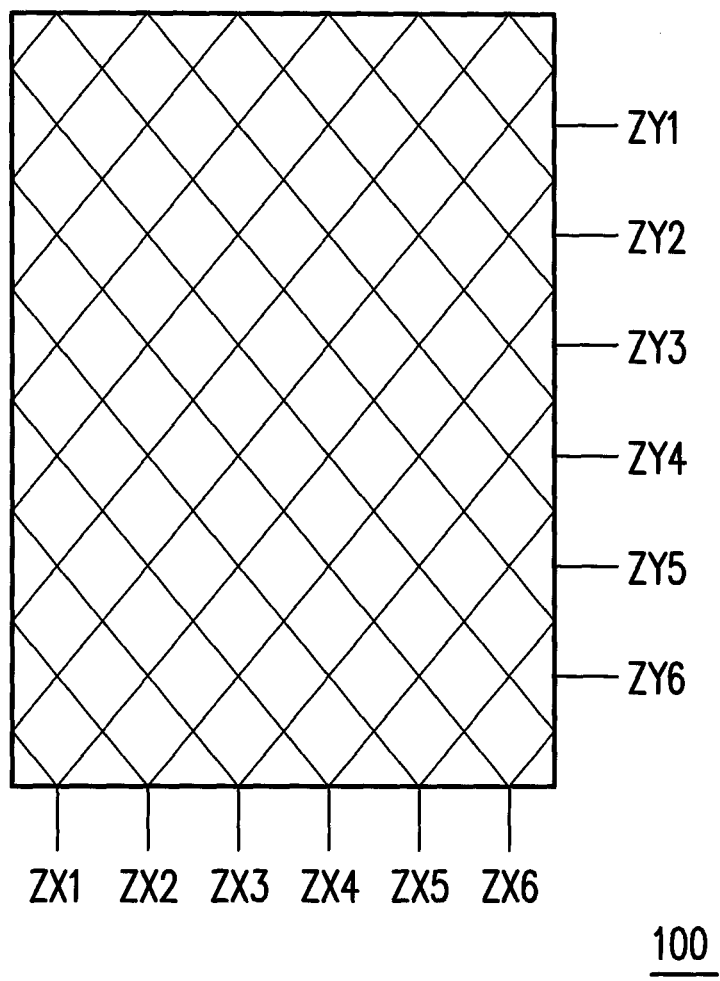
FIG. 1 is a schematic diagram illustrating a conventional capacitive touch panel 100.
Figure 2:
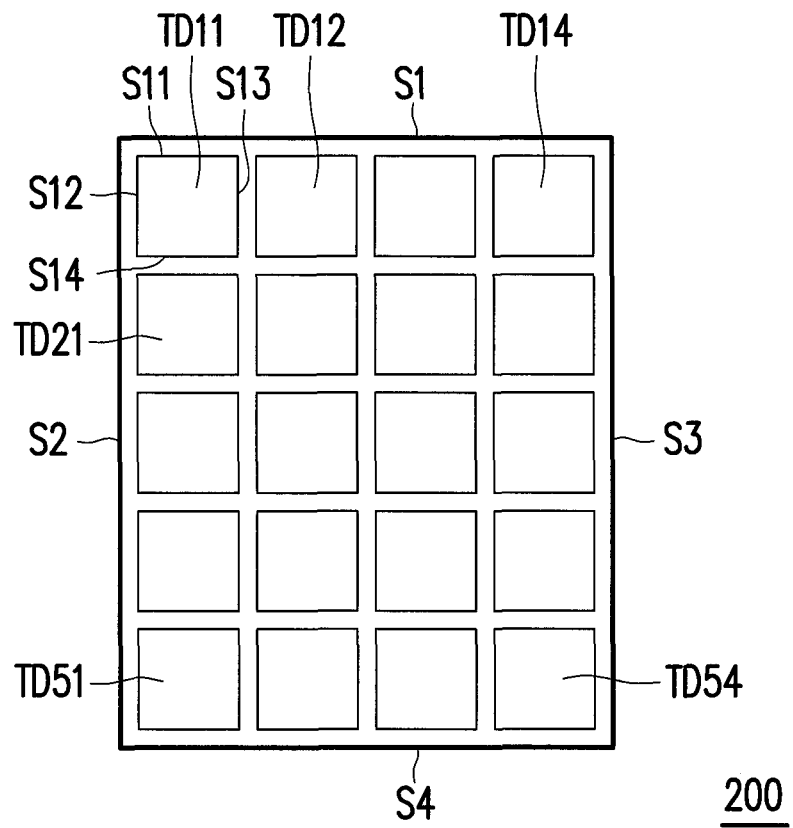
FIG. 2 is a schematic diagram illustrating a touch panel 200 according to an embodiment of the invention.

FIG. 2 is a schematic diagram illustrating a touch panel 200 according to an embodiment of the invention. The touch panel 200 includes a plurality of touch pads TD11 to TD54. The touch panel 200 has a first side S1, a second side S2, a third side S3, and a fourth side S4. The touch pads TD11 to TD54 are arranged in arrays on the touch panel 200. The exemplary touch pad TD11 has a first side S11, a second side S12, a third side S13, and a fourth side S14. The first side S11 of the touch pad TD11 is parallel to the first side S1 of the touch panel 200, and the second side S12 of the touch pad TD11 is parallel to the second side S2 of the touch panel 200. The first side S11 of the touch pad TD11 is not parallel to the second side S12 of the touch pad TD11.

In the present embodiment, each of the touch pads TD11 to TD54 is shaped as a quadrangle. The first side S11 and the second side S12 of the touch pad TD11 may or may not be perpendicular to each other.

In the touch panel, the touch pads (e.g., the touch pads TD11 to TD14) arranged in the same row constitute a row of touch pads, while the touch pads (e.g., the touch pads TD11 to TD51) arranged in the same column constitute a column of touch pads. The touch panel 200 described in the present embodiment includes four columns of the touch pads 200 and five rows of the touch pads 200.

Figure 3A:
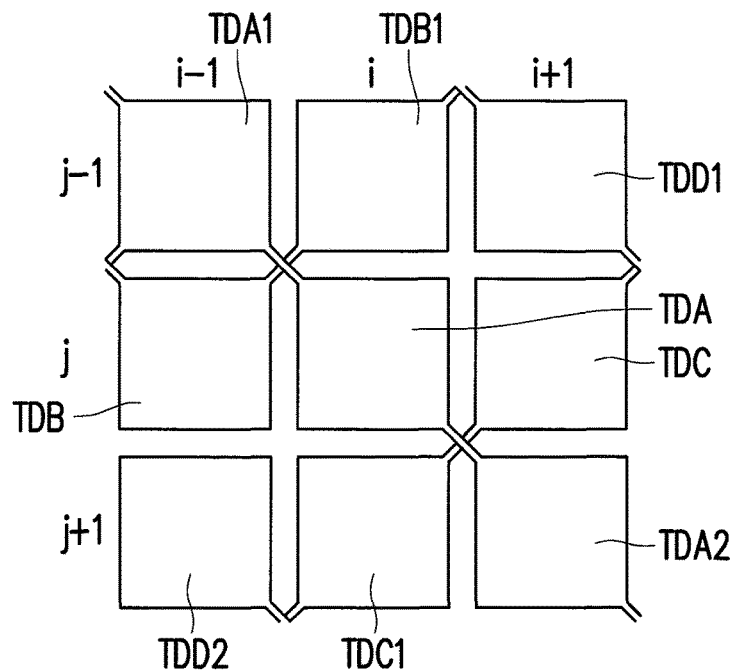
FIG. 3A and FIG. 3B are partial enlarged diagrams respectively illustrating different implementation details of the touch panel according to an embodiment of the invention.
Figure 3B:
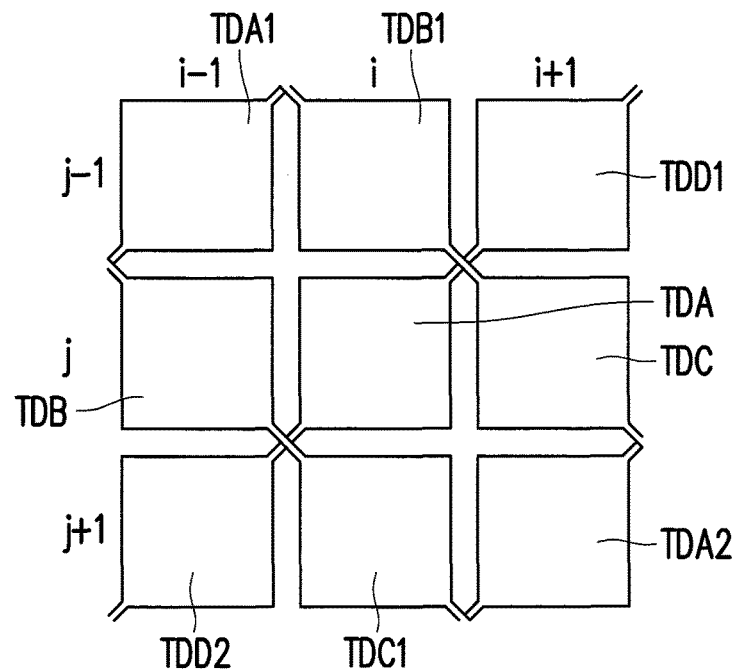

Please noted here, the touch pads TD11-TD54 are connected in a diagonal direction. In detail, please refer to FIG. 3A and FIG. 3B. FIG. 3A and FIG. 3B are partial enlarged diagrams respectively illustrating different implementation details of the touch panel according to an embodiment of the invention. In the touch panel shown in FIG. 3A, the touch pads TDA, TDA1, TDA2, TDB, TDB1, TDC, TDC1, TDD1, and TDD2 are arranged in (i−1), I, and (i+1) columns and in (j−1), j, and (j+1) rows. The touch pad TDA in the $i^{th}$ column and in the $j^{th}$ row is coupled to both the touch pad TDA1 in the $(i−1)^{th}$ column and in the $(j−1)^{th}$ row and the touch pad TDA2 in the $(i+1)^{th}$ column and in the $(j+1)^{th}$ row. Besides, the touch pad TDA in the $i^{th}$ column and in the $j^{th}$ row is physically isolated from the touch pad TDB in the $(i−1)^{th}$ column and in the $j^{th}$ row, the touch pad TDB1 in the $i^{th}$ column and in the $(j−1)^{th}$ row, the touch pad TDC1 in the $i^{th}$ column and in the $(j+1)^{th}$ row, and the touch pad TDC in the $(i+1)^{th}$ column and in the $j^{th}$ row.

In the embodiment shown in FIG. 3B, the touch pad TDA in the $i^{th}$ column and in the $j^{th}$ row is coupled to both the touch pad TDD1 in the $(i+1)^{th}$ column and in the $(j−1)^{th}$ row and the touch pad TDD2 in the $(i−1)^{th}$ column and in the $(j+1)^{th}$ row. In addition, the touch pad TDA in the $i^{th}$ column and in the $j^{th}$ row is physically isolated from the touch pad TDB in the $(i−1)^{th}$ column and in the $j^{th}$ row, the touch pad TDB1 in the $i^{th}$ column and in the $(j−1)^{th}$ row, the touch pad TDC1 in the $i^{th}$ column and in the $(j+1)^{th}$ row, and the touch pad TDC in the $(i+1)^{th}$ column and in the $j^{th}$ row.

Figure 4A:
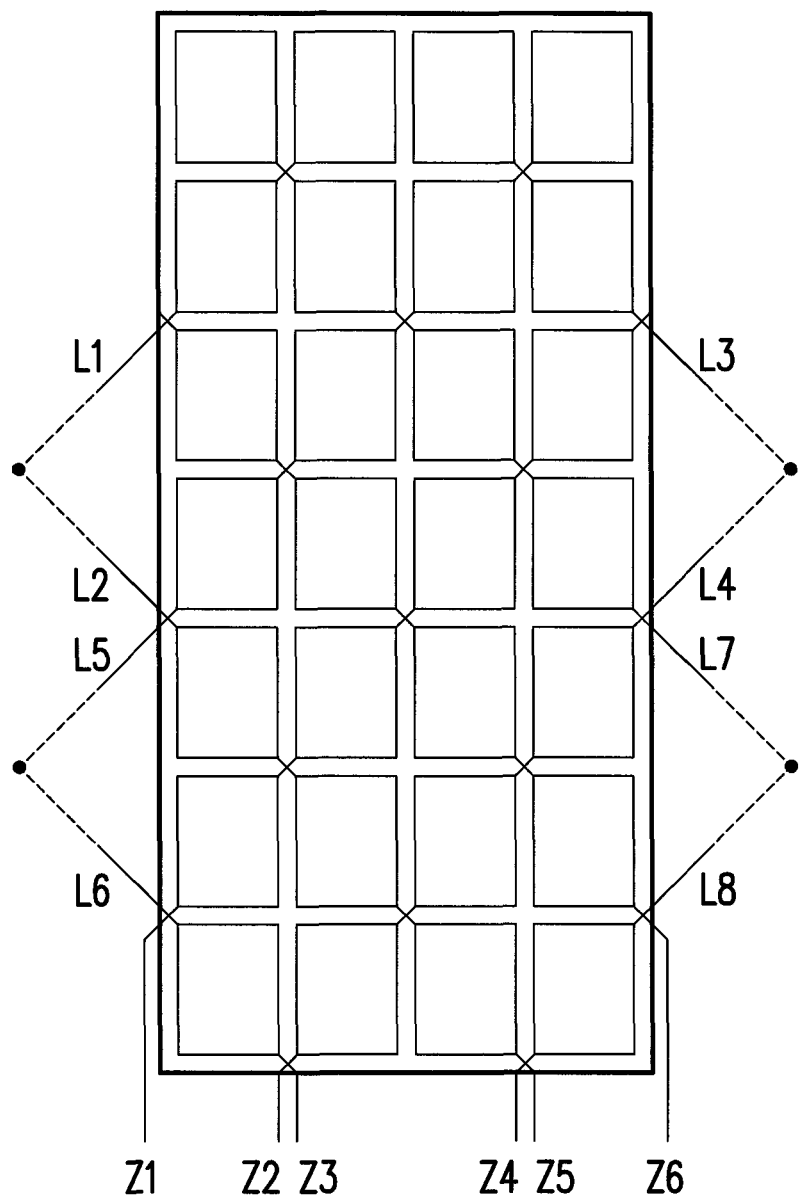
FIG. 4A is a schematic diagram illustrating a touch panel 400 according to an embodiment of the invention.

FIG. 4A is a schematic diagram illustrating a touch panel 400 according to an embodiment of the invention. According to the arrangement of the touch pads, the touch panel 400 is a 7×4 touch panel. In the touch panel 400, the conductor lines L1 and L2 are connected to each other, and so are the conductor lines L3 and L4, the conductor lines L5 and L6, and the conductor lines L7 and L8. Therefore, the touch panel 400 merely requires six signal transmission channels Z1 to Z6, which is five less than the number (7+4=11) of the signal transmission channels required by the conventional 7×4 touch panel. As such, the required number of signal transmission channels is effectively reduced herein.

Figure 4B:
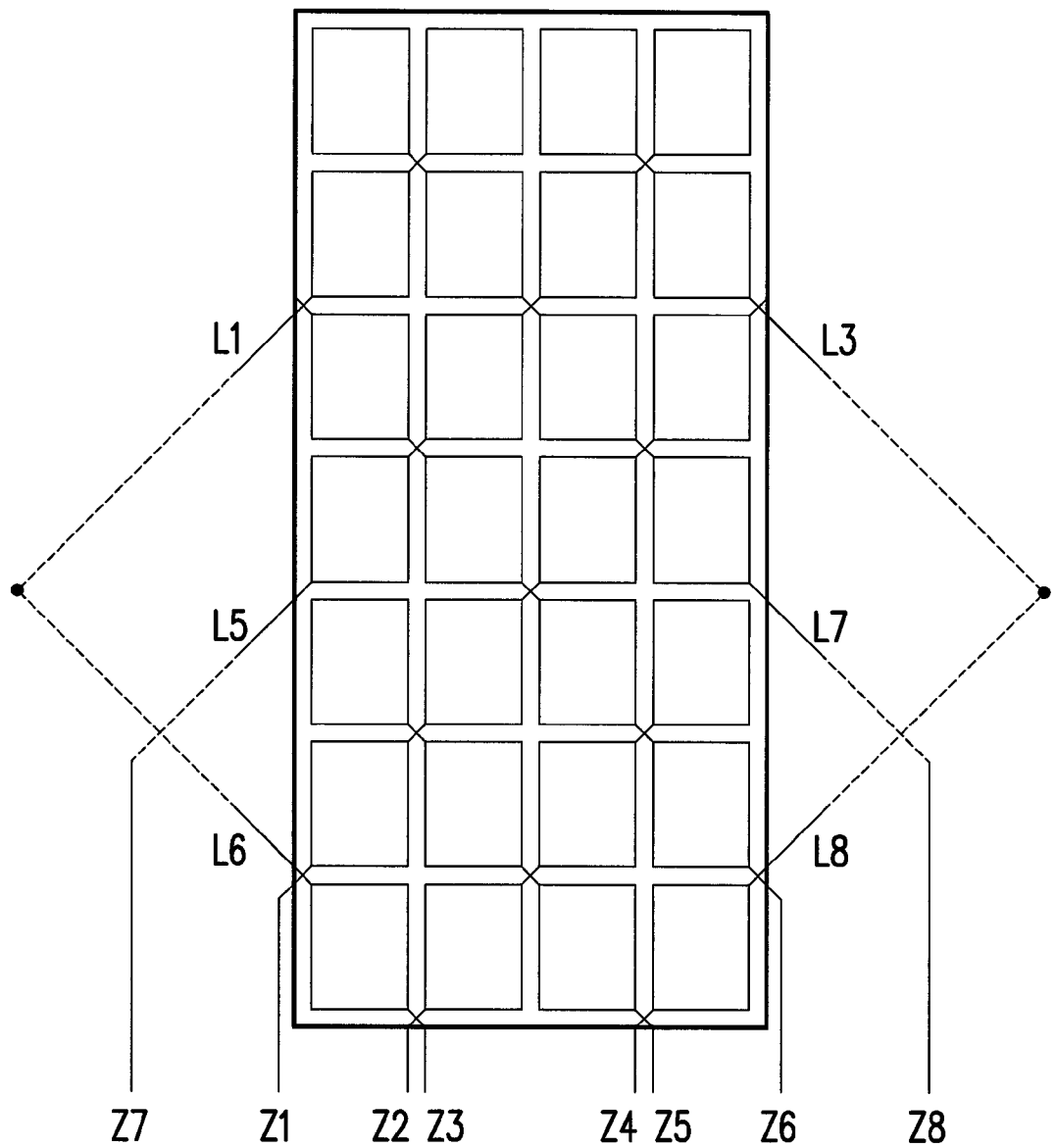
FIG. 4B is a schematic diagram illustrating the touch panel 400 according to another embodiment of the invention.

FIG. 4B is a schematic diagram illustrating the touch panel 400 according to another embodiment of the invention. In FIG. 4B, the conductor lines L1 and L6 in the touch panel 400 are connected to each other, and so are the conductor lines L3 and L8. Besides, the conductor lines L5 and L7 respectively constitute signal transmission channels Z7 and Z8. Therefore, the touch panel 400 described herein requires eight signal transmission channels Z1 to Z8.

As shown in FIG. 4A and FIG. 4B, the number of the signal transmission channels required by the touch panel 400 may be determined according to different ways to connect the conductor lines in the touch panel 400. Based on actual requirements, the connection relationship between different conductor lines may be adjusted to change the number of the signal transmission channels required by the touch panel 400. The illustration in FIG. 4A and FIG. 4B is merely exemplary and should not be construed as a limitation to the invention.

Figure 5A:
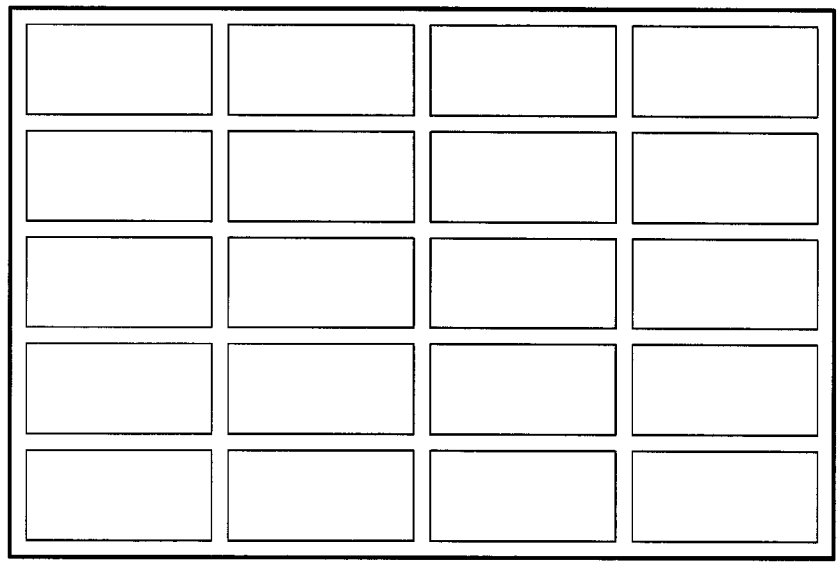
FIG. 5A to FIG. 5C respectively illustrate touch panels 510 to 530 according to different embodiments of the invention.
Figure 5B:
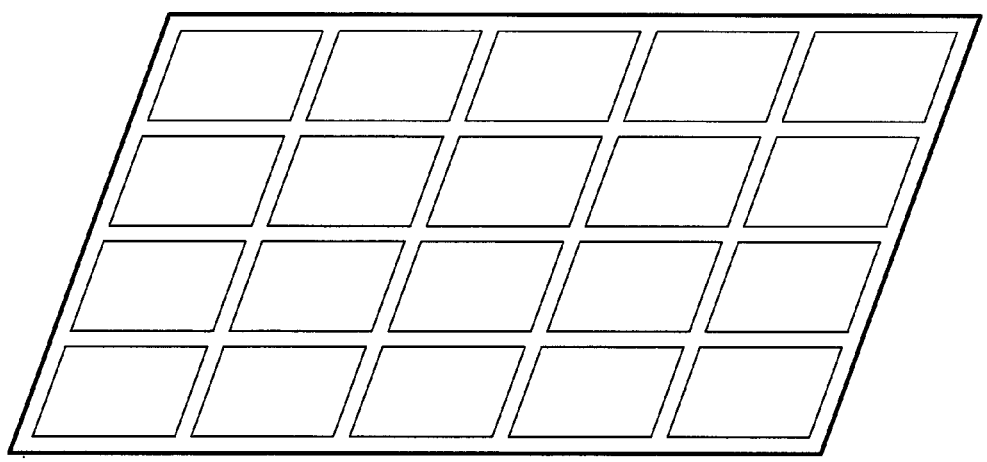
Figure 5C:
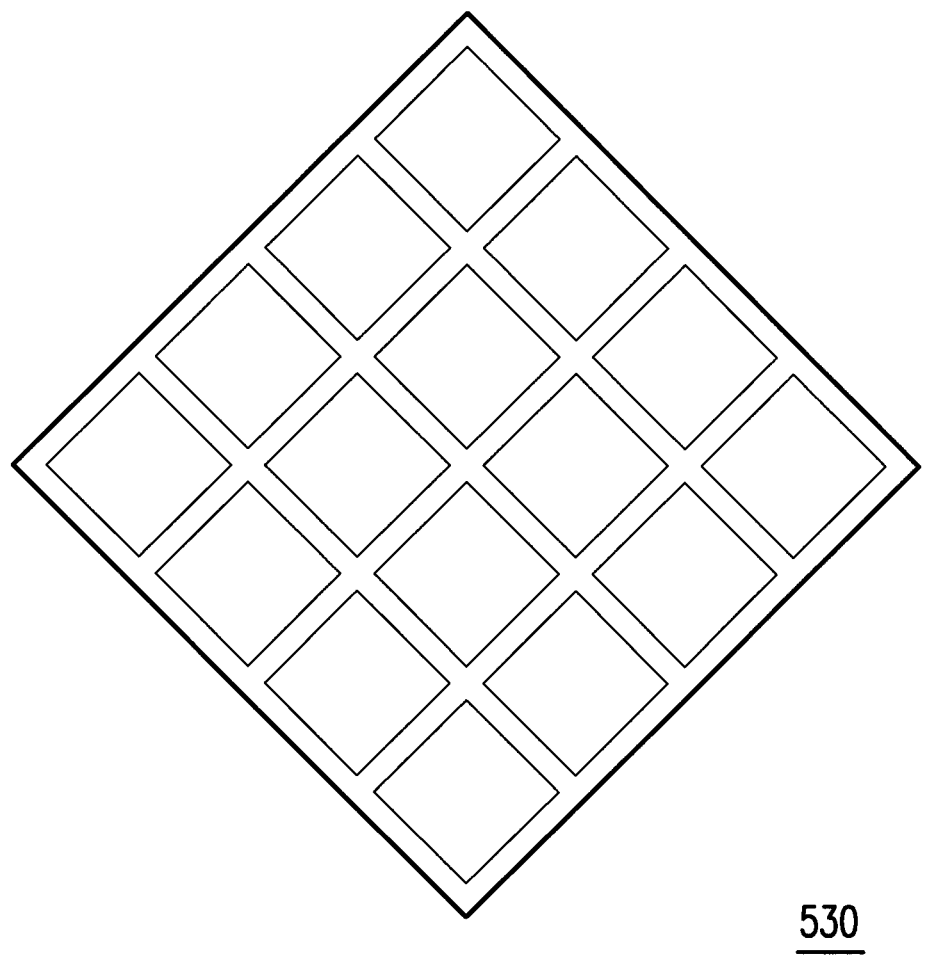

FIG. 5A to FIG. 5C respectively illustrate touch panels 510 to 530 according to different embodiments of the invention. The touch panel 510 and each touch pad included in the touch panel 510 shown in FIG. 5A are respectively of a rectangular shape. The touch panel 520 and each touch pad correspondingly included in the touch panel 520 shown in FIG. 5B are respectively shaped as a parallelogram. The touch panel 530 and each touch pad correspondingly included in the touch panel 530 shown in FIG. 5C are respectively shaped as a rhombus. In other words, the touch panel described herein is not limited to be shaped as the touch panel 200 shown in FIG. 2.

Figure 6:
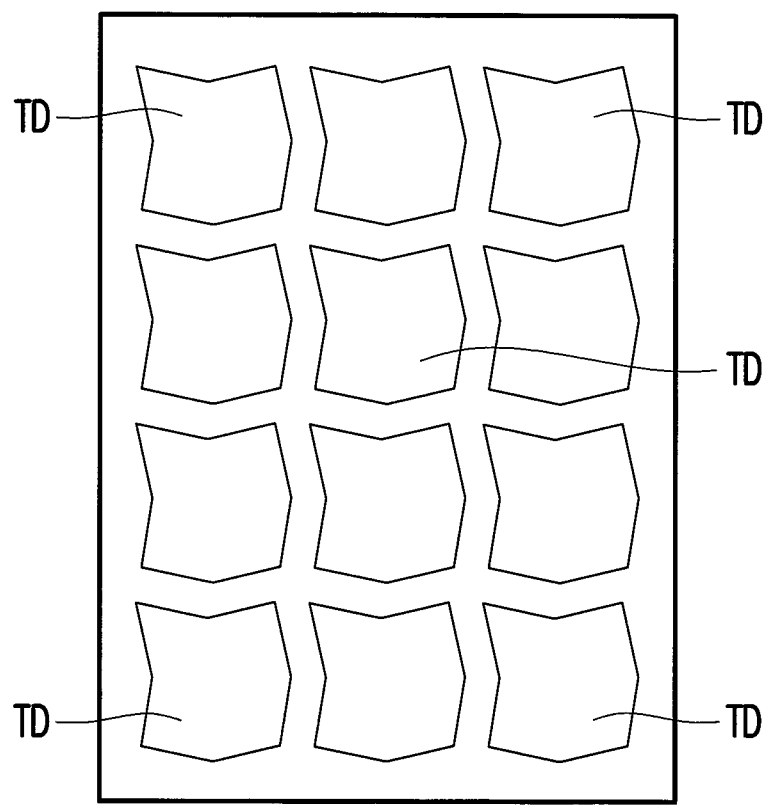
FIG. 6 illustrate touch panel 600 according to another embodiment of the invention.

Referring to FIG. 6, FIG. 6 illustrate touch panel 600 according to another embodiment of the invention. In FIG. 6, the touch panel 600 includes a plurality of touch pads TD, and the touch pads TD are arranged in an array. It should be noted here, the shape of each of the touch pads TD is not a quadrangle, each of the touch pads TD may be a polygon which has N sides, and N is larger than 2. Furthermore, the shape of each of the touch pads TD may be not the polygon, and may be an oval or a circle. That is, the shape of each of the touch pads TD in the touch panel 600 is not limited.

On the other hand, the connections of the touch pads TD in touch panel 600 may be as same as the embodiments of FIG. 2A or FIG. 2B. The signal transmission channels of the touch panel 600 may be formed by referring to FIG. 4A and FIG. 4B. The details of the connections of the touch pads TD and the signal transmission channels are described in the embodiments of FIG. 2A, FIG. 2B, FIG. 4A and FIG. 4B, and are not repeatedly described here.

To sum up, the touch panel described herein is comprised of a plurality of touch pads. The first and third sides of each of the touch pads are respectively parallel to the first and third sides of the touch panel, and the second and fourth sides of each of the touch pads are respectively parallel to the second and fourth sides of the touch panel. Thereby, the number of the signal transmission channels required by the touch panel may be effectively decreased, the layout area may be reduced, the complexity of the touch panel may be diminished, the required cost of the resultant product may be lowered down, and the market competitiveness may be advanced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch panel, comprising:
   a plurality of touch pads arranged in an array, the touch pads are arranged in N columns and M rows, the touch pad in the $i^{th}$ column and in the $j^{th}$ row is connected to the touch pad in the $(i−1)^{th}$ column and in the $(j−1)^{th}$ row and the touch pad in the $(i+1)^{th}$ column and in the $(j+1)^{th}$ row in a first direction,
   or the touch pad in the $i^{th}$ column and in the $j^{th}$ row is connected to the touch pad in the $(i+1)^{th}$ column and in the $(j−1)^{th}$ row and the touch pad in the $(i−1)^{th}$ column and in the $(j+1)^{th}$ row in a second direction, N and M are positive integers, and i and j are positive integers greater than 1 and respectively smaller than (N−1) and (M−1),
   wherein at least a first touch pad and a second touchpad in a boundary column are not adjacent to an end-most touchpad of the touchpads in the boundary column, wherein the boundary column is one of the first and last columns and the first and second touch pads are connected by a first conductor line and a second conductor line respectively so as to share a first signal transmission channel, and there is at least a third touch pad which is not connected by any of the first and second conductor lines and disposed on the boundary column and between the first and second touch pads, wherein the third touch pad is further connected to a third conductor line which is extended cross the second conductor line.

2. The touch panel as recited in claim 1, wherein the touch pad in the $i^{th}$ column and in the $j^{th}$ row is physically isolated from the touch pad in the $i^{th}$ column and in the $(j-1)^{th}$ row, the touch pad in the column and in the $(j+1)^{th}$ row, the touch pad in the $(i+1)^{th}$ column and in the $j^{th}$ row, and the touch pad in the $(i-1)^{th}$ column and in the $j^{th}$ row.

3. The touch panel as recited in claim 1, wherein each of the touch pads is shaped as a polygon.

4. The touch panel as recited in claim 1, wherein there is at least a fourth touch pad which is not connected by any of the first and second and third conductor lines, and disposed on the boundary column such that the second touch pad is between the third touch pad and the fourth touch pad, wherein the fourth touch pad is further connected to a fourth conductor line which is conducted to the third conductor line such that the third and fourth touch pads share a second signal transmission channel.

5. The touch panel as recited in claim 4, wherein there is at least a fifth touch pad which is not connected by the first and second and third and fourth conductor lines, and disposed on the boundary column and between the second touch pad and the fourth touch pad, wherein the fifth touch pad is further connected to a fifth conductor line which is extended cross the fourth conductor line.

6. The touch panel as recited in claim 5, wherein the first touch pad, the third touch pad, the second touch pad, the fifth touch pad and the fourth touch pad are disposed in an order along an extending direction of the boundary column, wherein there is further a sixth touch pad which is not connected by any of the first and second and third and fourth and fifth conductor lines, and disposed on the boundary column and between the first touch pad and the third touch pad.

7. The touch panel as recited in claim 1, there is at least a fourth touch pad which is not connected by any of the first and second conductor lines and disposed on the boundary column, wherein the fourth touch pad is further connected to a fourth conductor line which is extended cross the second conductor line.

\* \* \* \* \*